United States Patent
Bala et al.

(10) Patent No.: US 7,328,116 B2
(45) Date of Patent: Feb. 5, 2008

(54) VISUAL MONITOR CALIBRATION

(75) Inventors: Raja Bala, Webster, NY (US); Reiner Eschbach, Webster, NY (US); Gaurav Sharma, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/119,972

(22) Filed: May 2, 2005

(65) Prior Publication Data

US 2006/0247877 A1 Nov. 2, 2006

(51) Int. Cl.
*G01D 18/00* (2006.01)
*G01P 21/00* (2006.01)
*G01R 35/00* (2006.01)

(52) U.S. Cl. ......................... 702/107; 702/85

(58) Field of Classification Search ............... 702/85, 702/107; 345/428, 467, 581
See application file for complete search history.

(56) References Cited

U.S. PATENT DOCUMENTS

| | | | |
|---|---|---|---|
| 5,298,993 A | 3/1994 | Edgar et al. | |
| 5,754,222 A | 5/1998 | Daly et al. | |
| 5,923,315 A | 7/1999 | Ueda et al. | |
| 6,480,202 B1 * | 11/2002 | Deguchi et al. | 345/600 |
| 6,504,950 B1 * | 1/2003 | Murashita et al. | 382/162 |
| 6,686,953 B1 | 2/2004 | Holmes | |
| 6,851,809 B1 | 2/2005 | Sachtler | |
| 2005/0036112 A1 | 2/2005 | Sachtler | |
| 2005/0052344 A1 | 3/2005 | Wuerger | |
| 2005/0068291 A1 * | 3/2005 | Coley et al. | 345/156 |
| 2007/0176935 A1 * | 8/2007 | Arnold et al. | 345/467 |

* cited by examiner

*Primary Examiner*—Michael Nghiem
(74) *Attorney, Agent, or Firm*—Fay Sharpe LLP

(57) ABSTRACT

A method is presented for deriving gamma for a display monitor that does not involve color matching tasks. The method includes displaying a test pattern to a user on the display monitor. The test pattern includes at least one of a pattern of alternating light and dark regions displayed to the user at different gamma correction levels, or a grayscale character string displayed to the user at different digital gray levels against a background of two known luminance levels. Input is received from the user as to at least one of a gamma correction level that results in the pattern of alternating light and dark regions having light and dark regions of perceived equal size, or a digital gray level for the grayscale character string that results in maximum legibility of the text string against the two known background luminance levels. Gamma is derived for the display monitor based upon the user input.

7 Claims, 10 Drawing Sheets

FIG. 1 (PRIOR ART)
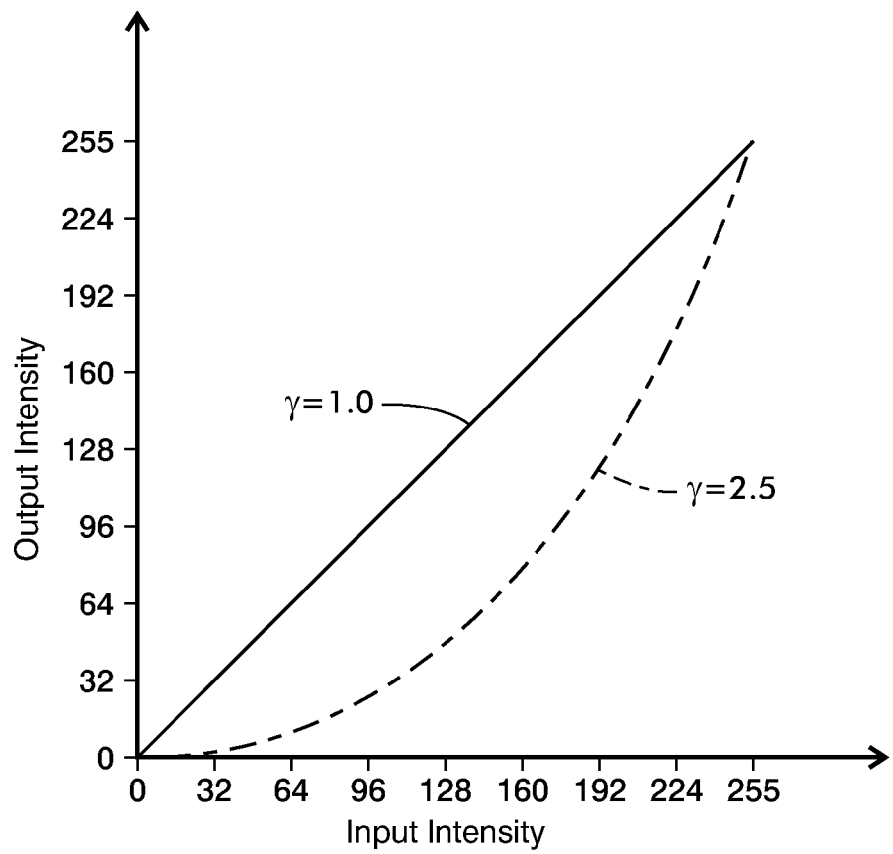
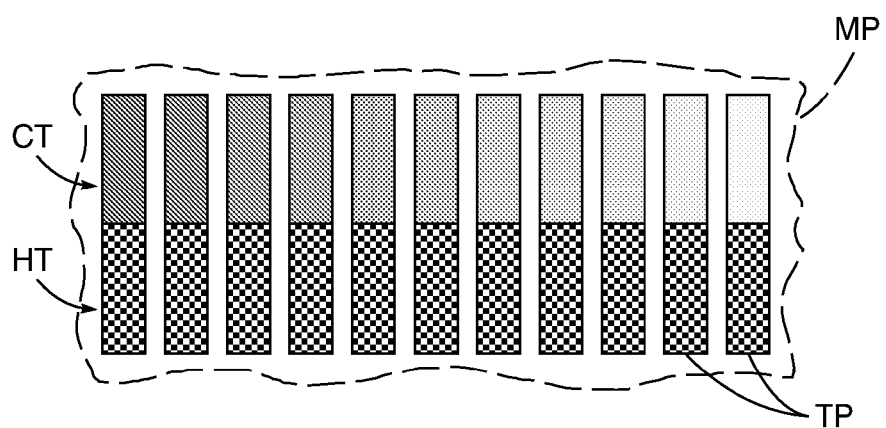
FIG. 2
(PRIOR ART)

VISUAL MONITOR CALIBRATION

BACKGROUND

Display monitors such as cathode ray tubes (CRT's) and others such as liquid crystal displays (LCD's) and the like are known to exhibit a non-linear tone response to input signals that results in output luminances that are nonlinearly related to the digital gray level input signals. This non-linear tone response can be most simply expressed as a power law equation:

$$L=D^\gamma \qquad \text{Eqn 1}$$

Where L is the output luminance exhibited by the display, D is the gray level digital input value (or gray level) driving the display, and the power-law $\gamma$ is referred to as the "gamma" of the display. For CRT display monitors, gamma is typically in the range of 1.8 to 2.55. The tone response is graphically illustrated in FIG. 1 for a gamma of 2.5 and an 8 bit-depth luminance range. The response may additionally be influenced by components in the image path such as video look-up tables (LUTs) in graphic display adapters. In FIG. 1, it can be seen that for an input digital gray level of 50%, (binary value 128), the display monitor will provide an output luminance of only 18% (binary value 45). Beside a strong difference in image luminance, this non-linear response also causes a color shift in the displayed image relative to the input image data. For display monitors other than CRT's, such as liquid crystal displays (LCD's) and the like, some non-linear response can also be exhibited with similar undesired results.

With the foregoing in mind, it is deemed necessary to calibrate a display monitor so that the output intensities and colors correspond as closely as possible to the actual digital gray level input values. For a printer manufacturer, monitor calibration is particularly important because the final output print will almost always be compared to the impression the user had on the display monitor. In professional graphic arts environments, careful measurements and calibrations are performed for a display monitor, using specialized instruments. This is obviously not possible for a typical home or office user printing photographs, web pages, etc. Instead, various visual calibration techniques have been devised and implemented by which a user can perform a visual matching task, comparing patches having differing color and/or luminance levels in order to derive various characteristics of the display, include the gamma of the display. The monitor can thus be calibrated accordingly, to the extent possible, to exhibit a linear response to the input signals. The actual power law equation for a CRT display monitor is more complex than described in Eqn. 1 and can be modeled as:

$$L=(\alpha D+\beta)^\gamma+\phi \qquad \text{Eqn 2}$$

where: L=output luminance; D=input digital gray level; $\alpha$=gain; $\beta$=offset; $\phi$=external light flare; and $\gamma$=the display gamma as described above. Note that by setting $\beta=\phi=0$ and $\alpha=1$, Eqn (2) reduces to the simpler model shown in Eqn (1). It has been found that determining the gamma ($\gamma$) for a particular display monitor and compensating for same using the simpler model in Eqn (1) provides a satisfactory monitor calibration technique for certain applications. Monitor calibration based solely on gamma ($\gamma$) as in Eqn (1) is commonly referred to as "gamma correction" and is intended to adjust the display monitor to compensate for the gamma value so that the display monitor exhibits a linear response ($\gamma=1$).

It should be noted from FIG. 1 that the display monitor gamma has no effect on an input gray level of 0%, i.e., black, or on an input gray level of 100%, i.e., white, but does affect the continuous tone values between these two extremes. Known gamma correction techniques have attempted to exploit this phenomenon to provide a visual calibration technique as shown in FIG. 2. A visual matching pattern MP is displayed to the user on a monitor. The visual matching pattern MP comprises a plurality of test patches TP, each of which includes a half-tone portion HT of a known luminance, e.g., 50% half-tone screen, and a continuous tone portion CT each related to a known digital gray level. As is well know in the art, the half-tone portion HT of each test patch TP is defined by a grid or other pattern of binary intensities of 0% ("off") or 100% which, at a typical viewing distance, is averaged by a human eye to a perceived continuous tone luminance level. Because the gamma value for a display monitor has no effect on the binary intensities of the half-tone portion HT, it provides a known reference luminance level depending upon the particular half-tone pattern used, and the half-tone portion HT is identical for each test patch TP. As shown, the half-tone pattern HT is intended to be perceived by a human as a 50% luminance or gray level. The continuous tone portions CT of the test patches TP correspond to respective digital gray levels that vary along a range that brackets the known luminance of the half-tone patterns HT, i.e., above, below and equal to the half-tone luminance. The user is then instructed to choose the test patch TP where the luminance of the continuous tone pattern CT most closely matches the luminance of the half-tone pattern HT. This selection process relates the digital gray level of the selected test patch TP (e.g., 70%) to the known luminance of the half-tone pattern HT (e.g., 50%) which allows the gamma value for the display to be derived. Often, this visual luminance matching operation is performed for each color separation, e.g., red, green, blue, of the display monitor and can be performed for more than one half-tone pattern HT.

This matching operation and others have been found to be deficient for a variety of reasons. The task of matching two colors or gray levels seems appealingly easy and simple, at least to one of ordinary skill in the art. For unskilled/untrained users, the task can be very difficult for various reasons. The user is asked to match patterns that have an inherently different spatial structure, and is forced to abstract the half-tone pattern to a luminance level in order to make the comparison. The difficulty is compounded by the fact that luminance/color matching is not a task that is commonly performed by users on a day-to-day basis.

In light of the foregoing deficiencies associated with known visual calibration techniques for display monitors that require a user to match intensities/colors, a need has been identified for a visual display monitor calibration technique that does not require a matching operation and, instead, requires the user to perform operations that are more intuitive. Two such tasks that are very common in standard user lives are (1) readability/ease of reading, where a user is asked to judge legibility of a text or general alphanumeric or iconic string and (2) comparing sizes/widths of simple adjacent/touching patterns. The terms "non-match" and "non-matching test pattern" describe cases where the user task does not involve "matching of color", "matching of luminance", or the like.

SUMMARY

In accordance with a first aspect of the development, a method for calibrating a display monitor for digital images includes: displaying a test pattern to a user on a display monitor, the test pattern comprising at least one of: a pattern of alternating light and dark regions displayed to the user at different gamma correction levels; and, (ii) a grayscale character string displayed to the user at different luminance levels against a background of two known luminance levels; receiving input from a user as to at least one of: (i) a gamma correction level that results in the pattern of alternating light and dark regions having light and dark regions of perceived equal size; and, (ii) a luminance level for the grayscale character string that results in the user perceiving maximum readability of the grayscale character string relative to the two known background luminance levels; and, calibrating the display monitor based upon the input received from the user.

Another aspect of the present development relates to a method for deriving gamma based upon visual output of a display monitor subject to a power law equation $L=(\alpha D+\beta)^{\gamma}+\phi$, where: L=output luminance; D=input digital gray level; $\alpha$=gain; $\beta$=offset; $\phi$=external light flare; and $\gamma$=gamma. The method includes: displaying test pattern to a user on the display monitor, the test pattern comprising at least one of: a pattern of alternating light and dark regions displayed to the user at different gamma correction levels; and, (ii) a grayscale character string displayed to the user at different digital gray levels against a background of two known luminance levels; receiving input from a user as to at least one of: (i) a gamma correction level that results in the pattern of alternating light and dark regions having light and dark regions of perceived equal size; and, (ii) a luminance level for the grayscale character string that results in the user perceiving maximum readability of the grayscale character string relative to the two known background luminance levels; and, deriving gamma for the display monitor based upon the user input.

BRIEF DESCRIPTION OF THE DRAWINGS

The development comprises various steps and arrangements of steps, preferred embodiments of which are disclosed herein with reference to the accompanying drawings, wherein:

FIG. 1 (prior art) graphically illustrates linear ($\gamma=1$) and non-linear ($\gamma=2.5$) tone response functions for a display monitor;

FIG. 2 (prior art) illustrates a conventional color/luminance visual matching test pattern;

DETAILED DESCRIPTION

Figure 3A:
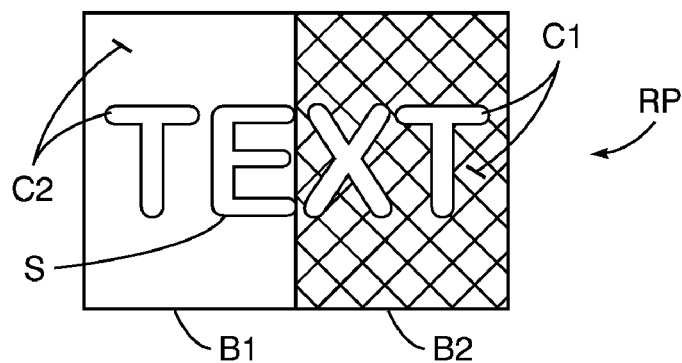
FIG. 3A illustrates a readability patch defined in accordance with the present development.
Figure 3B:
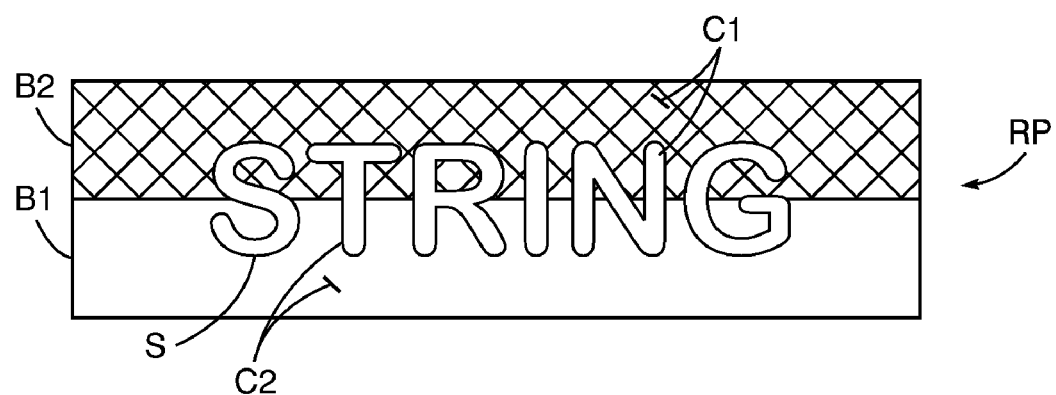
FIG. 3B illustrates another readability patch defined in accordance with the present development.

According to the present development, various visual monitor calibration techniques based on non-matching tasks are disclosed as methods for estimating gamma for a display monitor. In accordance with a first embodiment, the non-matching task is a readability task, wherein a user must assess readability of a textual, numerical or other character string relative to a background of known luminance or luminances. FIGS. 3A and 3B show simplified versions of this readability task wherein no patches need to be matched by the user and no gray levels need to be equated (the reader should keep in mind that the drawings of this specification are diagrammatic in nature to facilitate reproduction). In particular, a readability patch RP including a character string S of a known input digital gray level is displayed against a background comprising alternating sections B1,B2 exhibiting known luminances, e.g., maximum and minimum luminances corresponding to white and black alternating sections. It should be noted that the term "gray level" does not refer to the color gray but, instead, refers to the continuous input digital value between 0% and 100% for any color separation, including a black-and-white monochrome separation or red, green, blue separations or others. The presence of the character string S against the alternating background results in user perception of two different contrast levels: a first contrast level C1 of the gray level character string against the minimum luminance background (e.g., black); and a second contrast level C2 of the gray level character string against the maximum luminance background (e.g., white). The relative ratio of these contrast values C1,C2 is a function of the gamma value of the display monitor. The initial assumption of the present development is that the gray level character string should be perceived as being most readable by a user when the contrast levels C1,C2 are equal. For a display monitor, the contrast levels C1, C2 will be equal when the lightness of the character string is visually half of the way between the minimum and maximum lightness of the background. Using CIE color definitions, this corresponds to 50% fractional L* or roughly to 18% fractional luminance.

Figure 4:
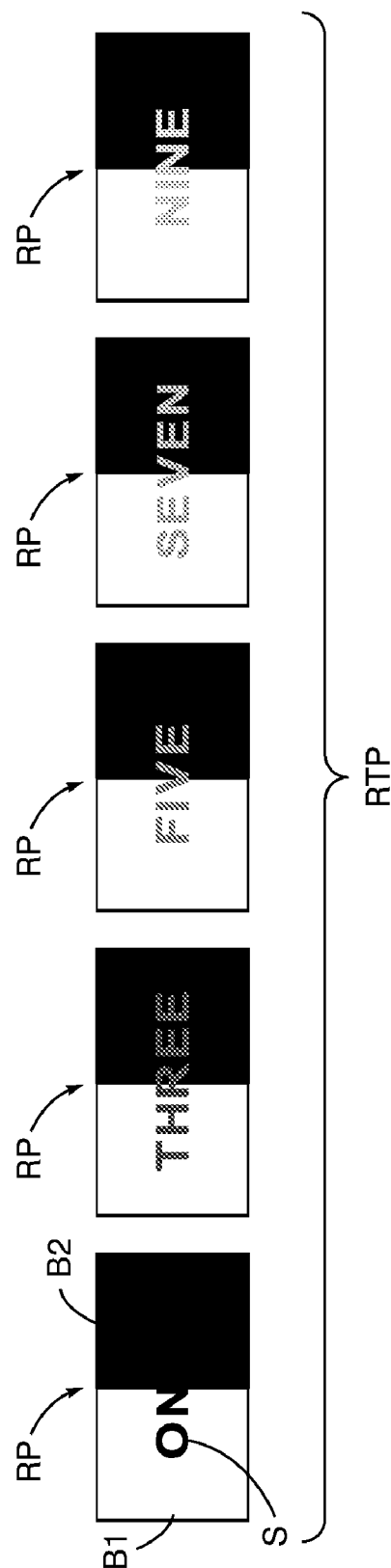
FIG. 4 illustrates a readability test pattern defined by a plurality of readability patches in accordance with the present development.

With this assumption of best readability at 18% fractional luminance, which can be modified based upon empirical data, a non-matching readability test pattern RTP defined by at least one or a plurality of readability patches RP in accordance with the present development as shown in FIG. 4. The nominal input digital gray levels for the character strings S of the readability patches RP are selected to bracket (i.e., be above, below and equal to) the digital gray level that produces the 18% fractional luminance presumed to provide easiest readability. The user is then instructed to select the readability patch RP of the pattern RTP for which the character string S is most readable and this, then, allows the gamma value of the display monitor to be derived based upon a correspondence between the input digital gray level of the character string S for the selected readability patch RP and the presumed fractional luminance of the character string (18% in the present example). Thus, for example, if the simpler monitor model of Eqn (1) is assumed, and the readability patch RP (including the textual word "SEVEN") selected by the user has a nominal digital gray level of 40% (or D=0.4) for the character string S, the gamma value is derived as:

$$\gamma = \log(L)/\log(D) \qquad \text{Eqn (3)}$$

where L is the presumed fractional luminance corresponding to optimum readability (0.18 in the present example). As such, in the present example, $\gamma=\log(L)/\log(D)=\log(0.18)/\log(0.4)=1.87$.

The non-matching readability test pattern RTP defined by a plurality of readability patches RP as shown in FIG. 4 can be displayed to the user in grayscale mode, in which case the single resulting value of gamma is used to correct all the color separations (e.g. red, green, blue) of a color display monitor. Alternatively the readability patches can be displayed for each color separation of a color display monitor to derive a potentially different value gamma ($\gamma$) for each separation. The resulting multiple gamma values can then be used to provide gamma correction for the related color separation data or the multiple values can be averaged to provide a single gamma value which is then used to provide the same gamma correction for each color separation.

In an alternative embodiment, the readability patches RP of the test pattern RTP are varied so that the gray level character string S of a known nominal luminance level, i.e., a known digital gray level, is displayed against a background comprising alternating sections exhibiting full luminance (e.g., white) and a known half-tone luminance (as opposed to 0% luminance (black) as shown in FIGS. 3A and 3B), e.g., alternating sections of white and 50% half-tone screen. Stated another way, either background section B1,B2 can be defined as a known half-tone level. In such case, the initial assumption for best readability of the character string S would be a luminance level located at a fixed pre-determined fraction between the luminances of the background sections B1 and B2.

Figure 9:
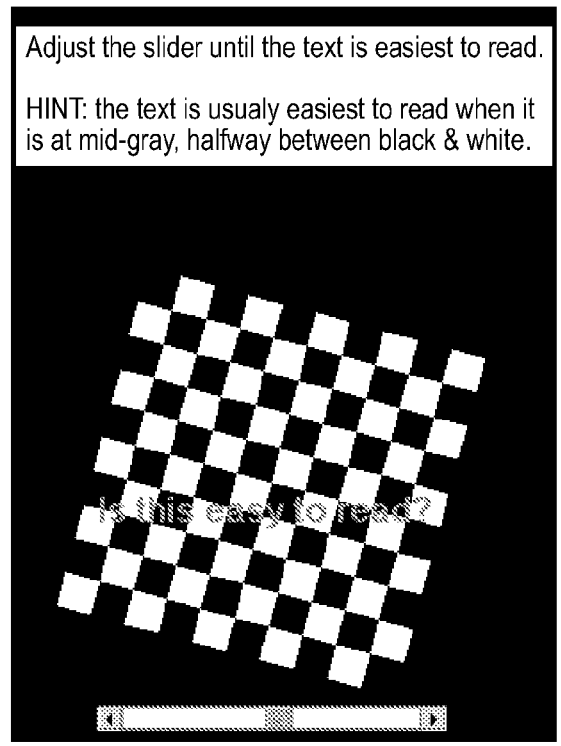
FIG. 9 illustrates another example of a readability test pattern defined in accordance with the present development.

In another alternative embodiment as shown in FIG. 9, only a single readability patch RP is displayed to the user as a non-matching readability test pattern RTP, and the user is also provided with an input device such as a keyboard, a pointing device such as a mouse that is used to select a slider bar or the like, etc., by which he/she can adjust the input digital gray level, and thus the corresponding output luminance of the character string S until perceived visibility/readability of the string S is maximized (the string S is shown as the question "Is this easy to read?"). The final digital gray level selected by the user as being preferred is used to derive gamma ($\gamma$) for the display monitor as described above using Eqn (3).

Figure 5:
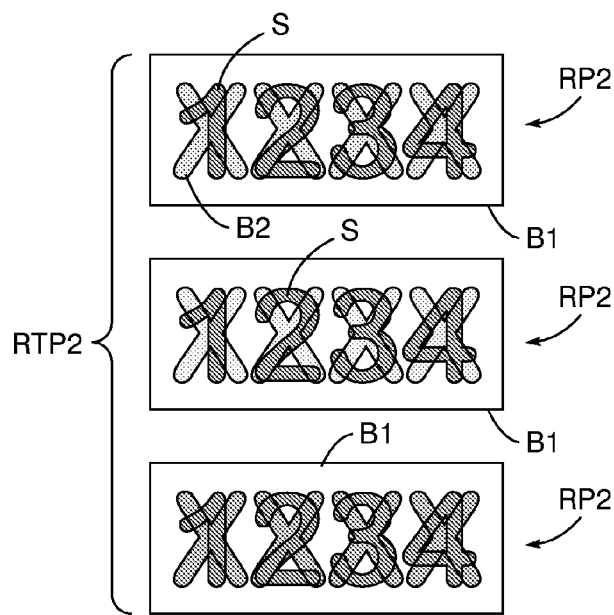
FIG. 5 illustrates an alternative readability test pattern including extraneous information as a visual interference pattern.

FIG. 5 discloses another non-matching readability test pattern RTP2 defined by a plurality of readability patches RP2. The readability test pattern RTP2 is useful for determining the individual gains for the various color channels of a display monitor for white-point calibration. Each readability patch RP2 includes a background defined by two different digital gray levels, wherein a first digital gray level of a first color channel is used as a filler B1 and where a second digital gray level of a second color channel is used to distribute distracting characters B2 (the string "XXXX" in the current example) throughout the background filler B1.

Each readability patch RP2 also includes a primary character string S (the string "1234" in the current example) defined at a known gray level, e.g., maximum value (white) or minimum value (black). The gray level of the distracting characters B2 is varied for each readability patch RP2 so that the primary character string S of one of the readability patches RP2 will be perceived by the user as being most easily readable. This will occur when the luminance of the distracting characters B2 most closely matches that of the background filler color B1. Owing to differences in gain between the different color channels, the input digital gray levels that produce a given level of luminance will not be nominally equal across the color channels. The readability patches RP2 of the test pattern RTP2 are selected to have luminances for distracting characters B2 that bracket the nominal luminance for the background filler B1. As such, the readability patch RP2 selected by the user as being most readable will provide a good indication as to variation in gain between the color channels. It should be noted that the readability test pattern RTP2 exploits the fact that a luminance difference between two image regions is more visually apparent and distracting as compared to a pure color variation due to the strong low-pass behavior of the chrominance channel in the human visual system. Here, again, a single readability patch RP2 can be used along with an input device such as a mouse controlling a slider that allows the user to control the input digital gray levels of the distracting characters B2 until the user selects a preferred gray level for best readability of the primary character string S.

Figure 6:
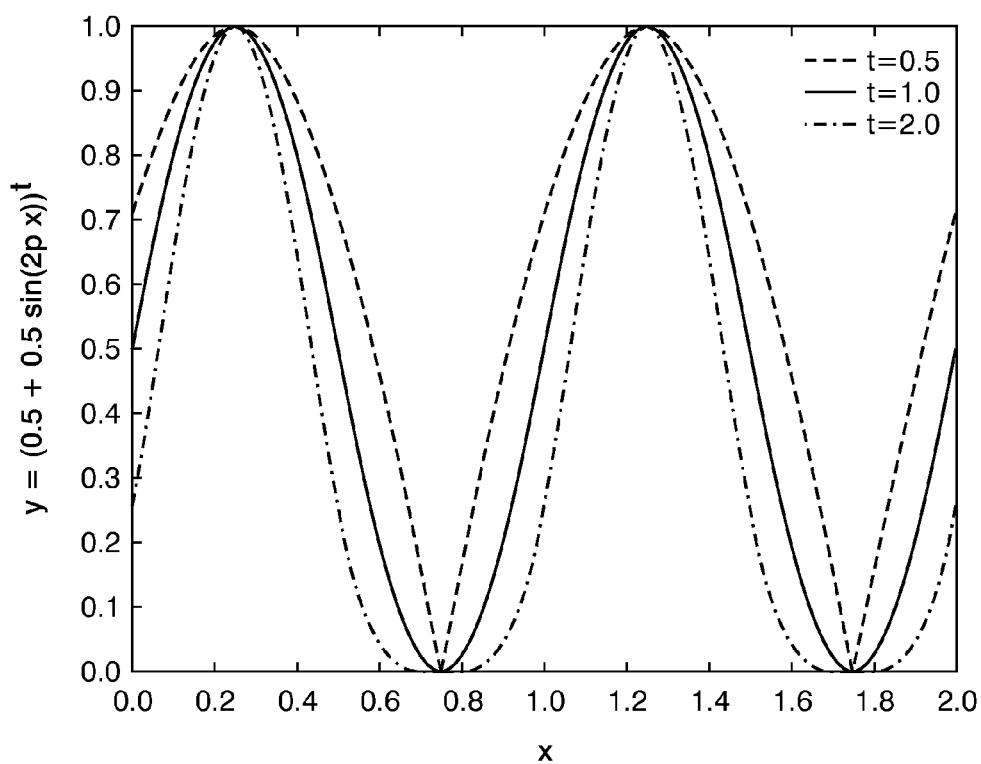
FIG. 6 graphically shows a sine function plotted according to three different power-law responses to illustrate the effect of the power-law non-linearity.

Other non-matching visual monitor calibration methods can be used according to the present development. One such method exploits the interaction between display monitor non-linearity and spatially-varying content in a test pattern (e.g., a one-dimensional sinusoidal lightness pattern) and does not require the user to match intensities in test patches. FIG. 6 graphically illustrates three different one-dimensional sine functions plotted to represent the function:

$$y = (0.5 + 0.5 \sin(2\pi x))^t \qquad \text{Eqn (4)}$$

where the three plots correspond respectively to t=0.5, t=1.0, t=2.0. It is clearly shown that the power-law non-linearity changes the spatial characteristics of the curve. For t<1, the regions in the vicinity of the peaks (around y=1) are wider in comparison to the regions in the vicinity of the valleys (around y=0); for t>1 the valleys are wider than the peaks; and for t=1 (power-law of 1), the valleys and peaks have matched widths. Hence a tangible relationship exists between the relative widths of the peaks and valleys of the sine function, and the power-law (gamma) nonlinearity applied to the sine function. Thus, a more natural visual task of size/width comparison can be performed by a user which can be subsequently used to determine the gamma value of the monitor.

With FIG. 6 in mind, it is clear that the power-law non-linearity interacts with the spatial-variation in an image. In particular, if the input image has a sinusoidal variation in lightness as displayed on a linear display monitor ($\gamma=1$), the variation in lightness of the input image will not be sinusoidal for a non-linear display monitor ($\gamma<1$ or $\gamma>1$). For a display monitor with $\gamma>1$, the darker regions (valleys) of the image become wider while the lighter regions (peaks) become narrower; for a display monitor with $\gamma<1$, the lighter regions (peaks) of the image become wider while the darker regions (valleys) become narrower. This phenomenon is exploited to provide a non-matching task for gamma estimation as described below in relation to one embodiment as shown in FIGS. 7A and 7B.

Figure 7A:
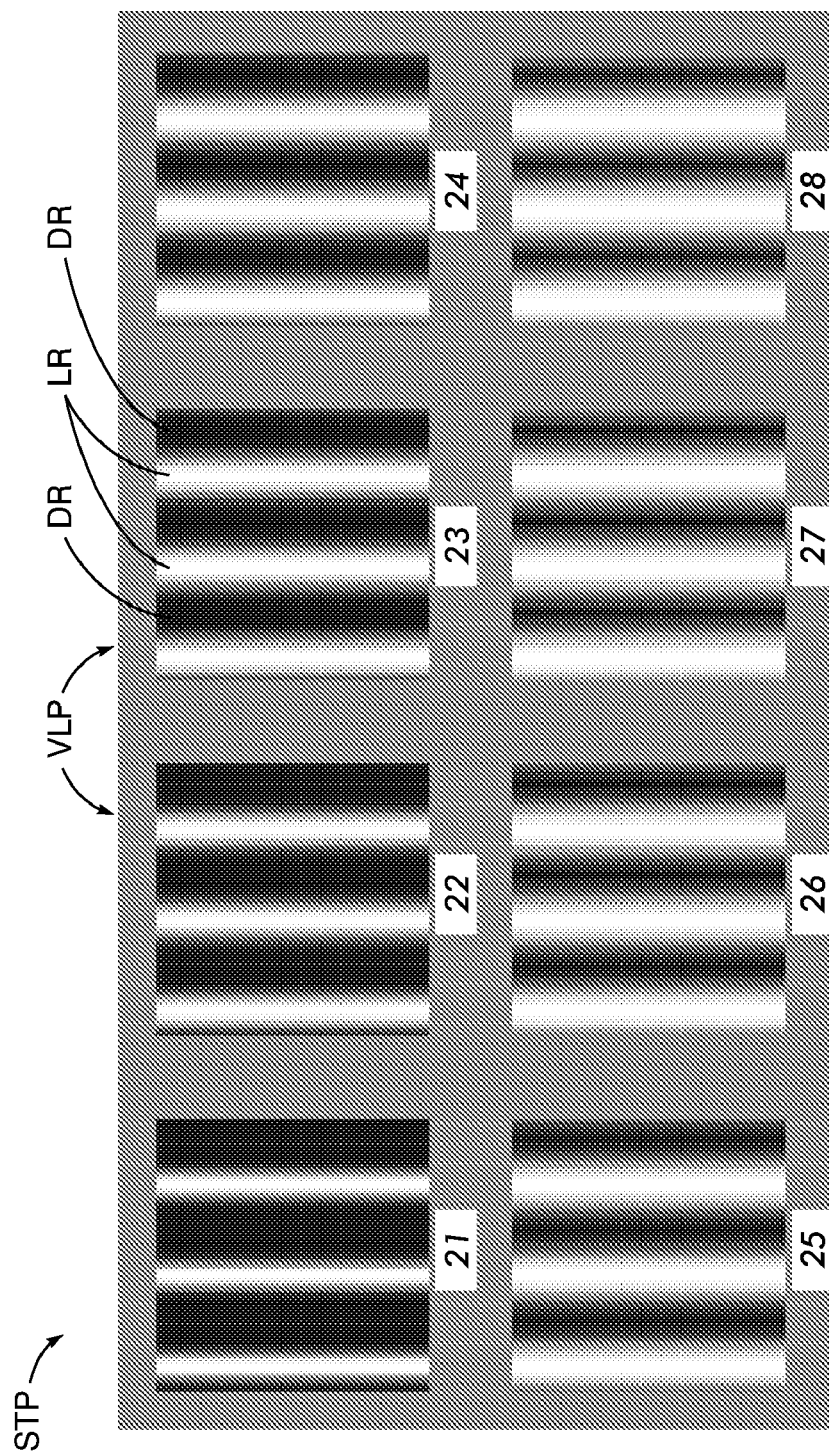
FIGS. 7A and 7B illustrate respective alternative non-matching test patterns in accordance with the present development.

FIG. 7A illustrates one embodiment of a non-matching test pattern STP including a plurality of vertical lightness patterns VLP each defined by vertically extending alternating light regions LR and dark regions DR. Each vertical lightness pattern VLP is derived from an input sinusoidal lightness pattern that is pre-corrected for a presumed display monitor non-linearity gamma value ($\gamma$). The user is instructed to select the vertical lightness pattern VLP having light and dark regions LR,DR that are most closely matched in width. The gamma value associated with the vertical lightness pattern VLP selected by the user is then known to be the correct gamma for the display monitor in question.

Figure 7B:
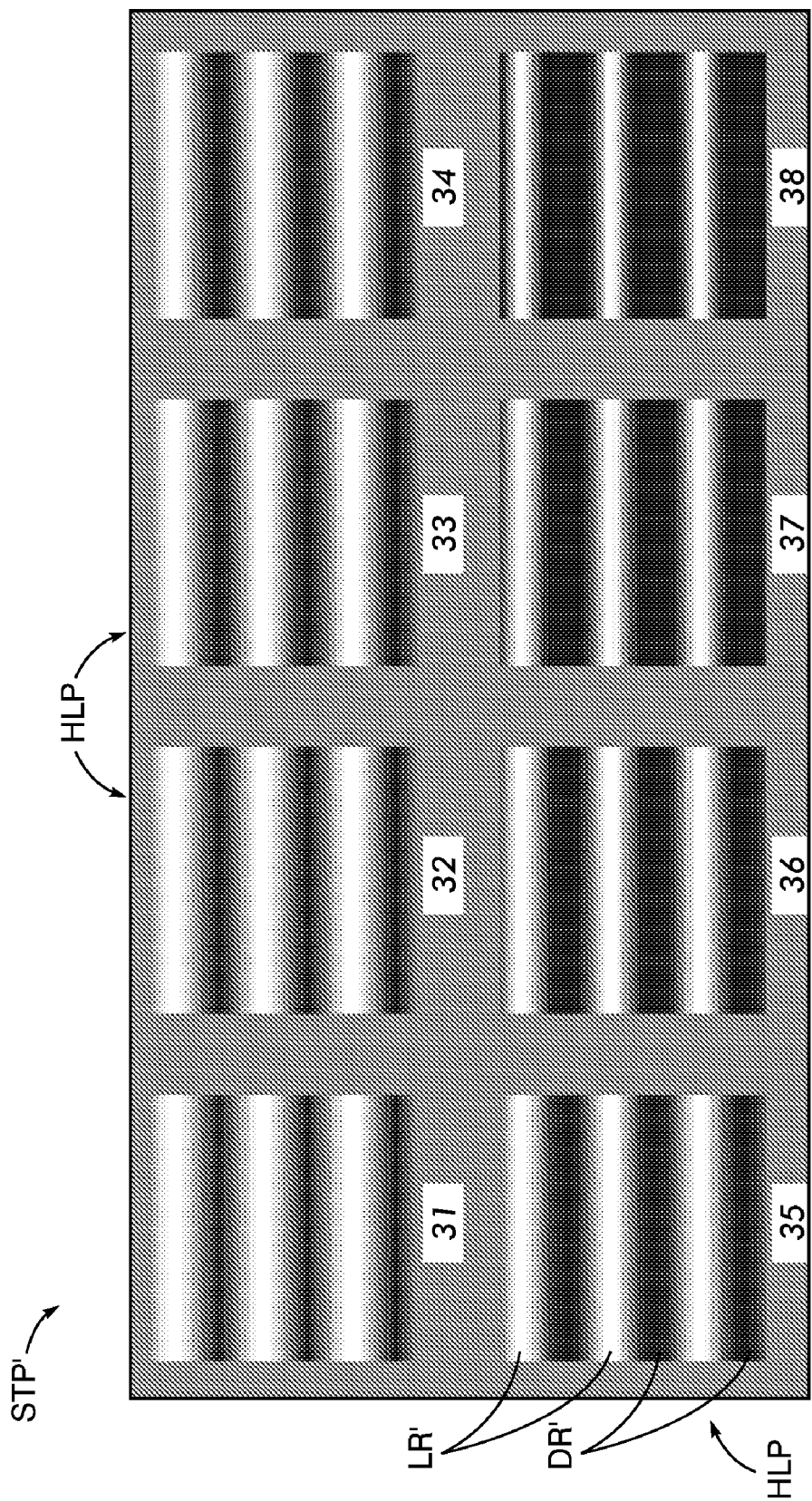

FIG. 7B illustrates a similar embodiment of a non-matching test pattern STP' including a plurality of horizontal lightness patterns HLP each defined by horizontally extending alternating light regions LR' and dark regions DR'. Each horizontal lightness pattern HLP is derived from an input sinusoidal lightness pattern that is pre-corrected for a presumed display monitor non-linearity gamma value ($\gamma$). The user is instructed to select the horizontal lightness pattern HLP having light and dark regions LR',DR' that are most closely matched in height. The gamma value associated with the horizontal lightness pattern HLP selected by the user is then known to be the correct gamma for the display monitor in question.

In one preferred embodiment, the non-matching test pattern includes both a plurality of vertical lightness patterns VLP and horizontal lightness patterns HLP, i.e., a combination of the pattern STP and the pattern STP', wherein each lightness pattern is derived from an input image defined according to a product of a horizontal and a vertical sinusoidal variation in lightness. In such case, the user selects one vertical lightness pattern VLP having light and dark regions LR,DR most closely matched in width and selects one horizontal lightness pattern HLP having light and dark regions LR',DR' most closely matched in width. If the gamma values associated with the selections VLP,HLP are different, they are averaged to derive the gamma value for the display monitor.

Figure 8A:
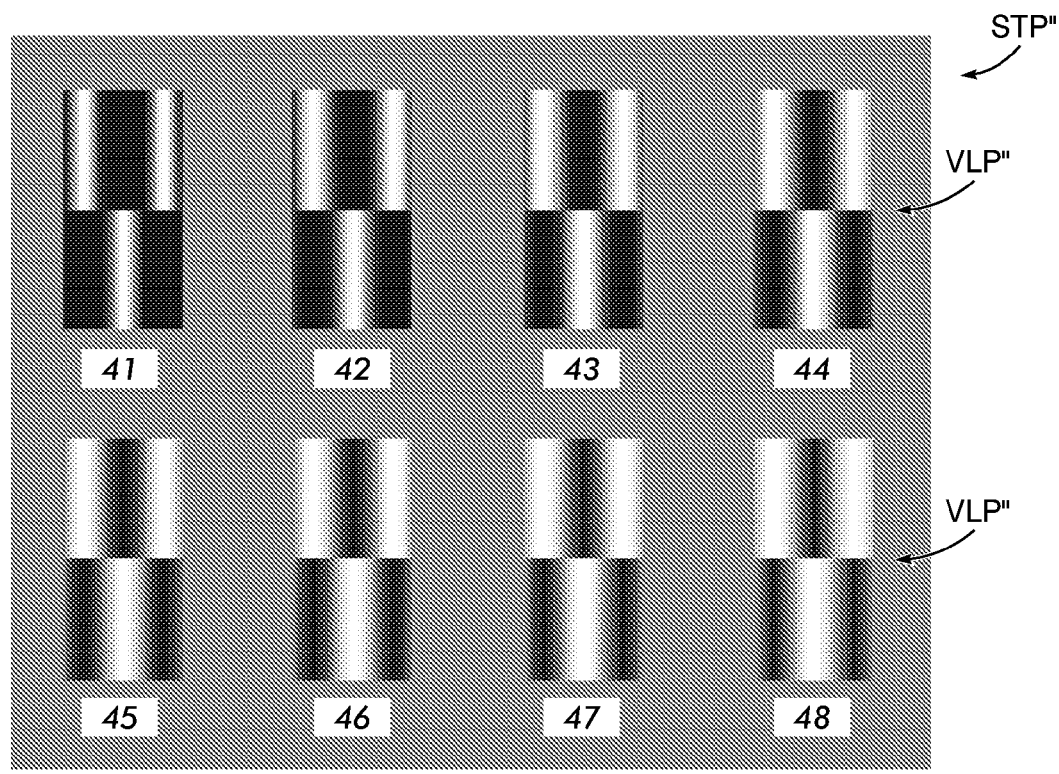
FIG. 8A illustrates another embodiment of a non-matching test pattern defined in accordance with the present development.
Figure 8B:
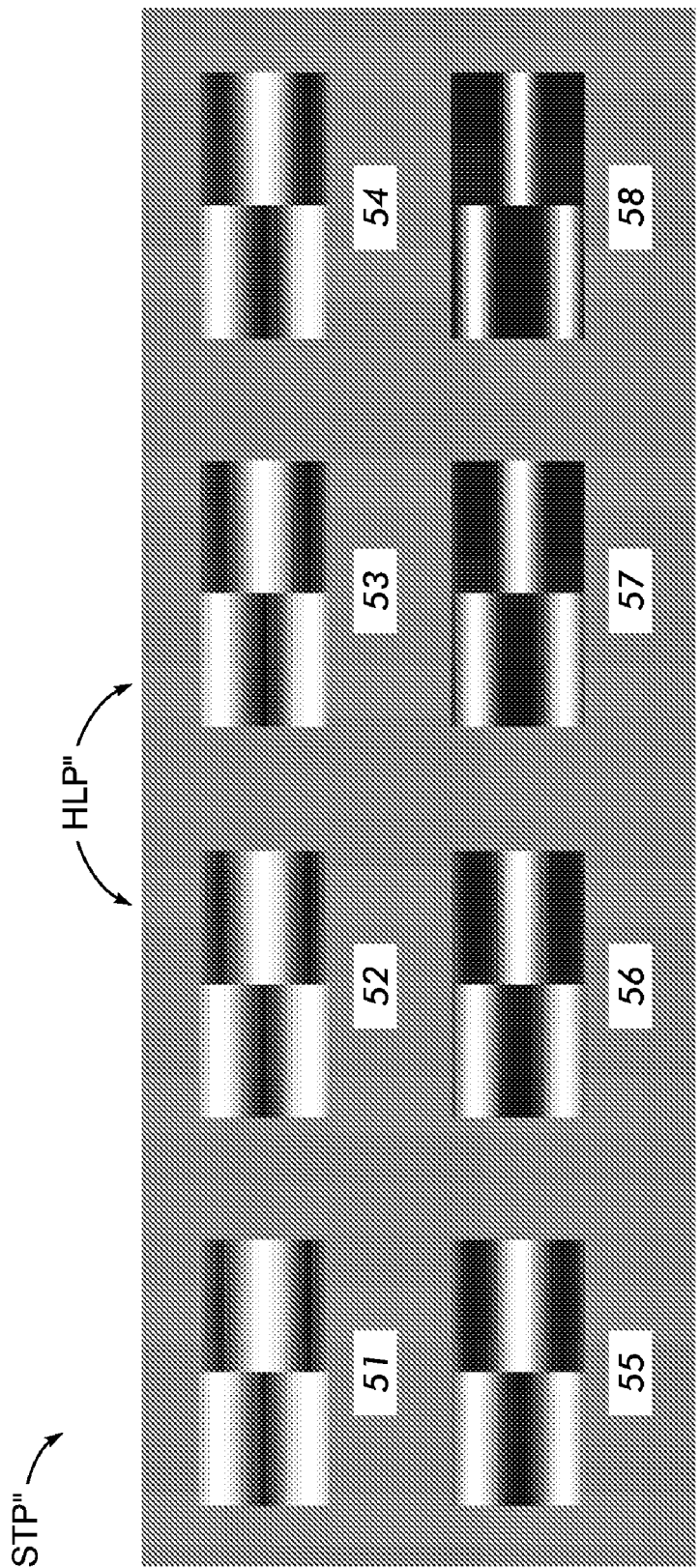
FIG. 8B illustrates another embodiment of a non-matching test pattern defined in accordance with the present development.

FIGS. 8A and 8B each illustrate another variation STP", wherein the vertical lightness patterns VLP" (FIG. 8A) and horizontal lightness patterns HLP" (FIG. 8B) are identical to those described above except that each pattern is divided in half, and each half is offset from the other by a half-cycle, or one light/dark region (peak/valley) in an effort to simplify the user's task of selecting the pattern where the light and dark regions most closely match in width. It should be noted that the patterns shown in FIGS. 8A and 8B are "non-matching" test patterns in the language of this description, since no luminance/color matches are performed.

Figure 10:
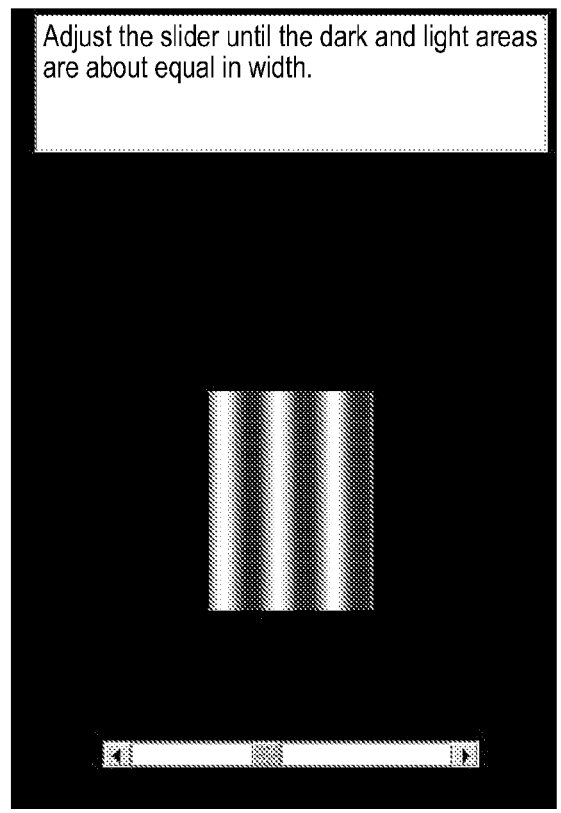
FIG. 10 illustrates another example of a non-matching test pattern in accordance with the present development.

In another alternative embodiment as shown in FIG. 10, only a single vertical (or horizontal) lightness pattern VLP is displayed to the user as a non-matching test pattern, and the user is also provided with an input device such as a keyboard, a pointing device such as a mouse that is used to select a slider bar or the like, etc., by which he/she can adjust the gamma correction on-the-fly to a point where the light and dark regions LR,DR appear to have equal size. The gamma correction setting selected by the user is then known to be suitable for the display monitor.

Figure 11:
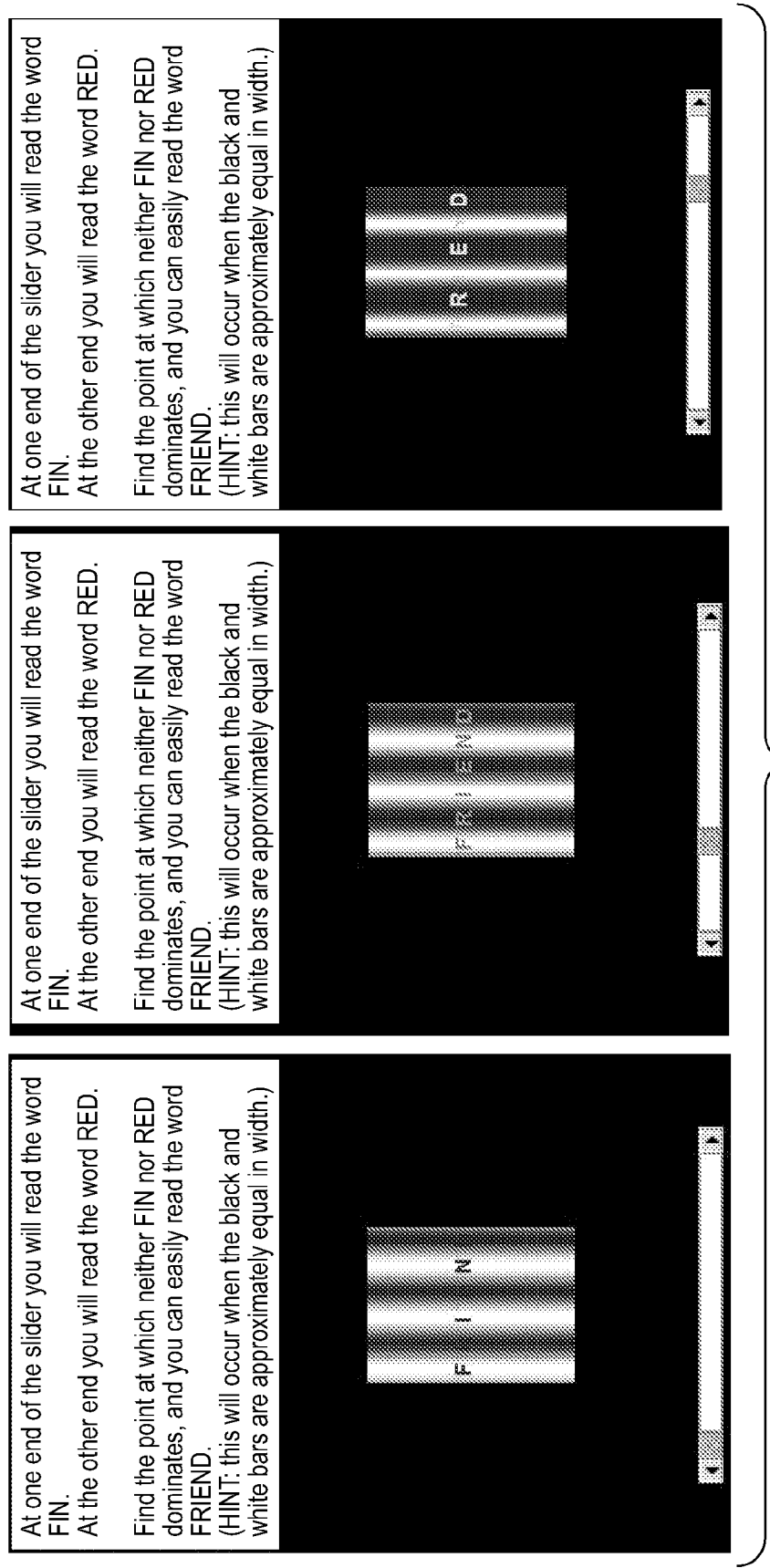
FIG. 11 illustrates a readability test pattern that combines features of FIG. 9 and FIG. 10.

In another alternative embodiment, the aforementioned readability and light/dark width matching tasks are combined into a single task, as shown in FIG. 11. In this example a foreground text string "FRIEND" is overlaid on top of a sinusoidal background pattern. The user is provided with an input device such as a keyboard, a pointing device such as a mouse that is used to select a slider bar or the like, by which he/she can simultaneously adjust the luminance of the foreground text string, and the relative widths of the light and dark regions of the sinusoidal background pattern. The user is asked to adjust the slider until the foreground text string "FRIEND" is most legible, and the light and dark regions of the background appear to have equal width. The slider setting is then used to determine the gamma for the display. The correspondence between slider setting and display gamma is pre-established by conducting the visual experiment on a calibrated display with known gamma.

EXAMPLES

Example 1

Text-Against-Checkerboard

The task is shown in FIG. 9. The observer adjusts the gray level of the text "Is this easy to read?" with the slider using a mouse or other input device until the text is easiest to read. The hypothesis is that this occurs when the text gray level is visually half-way between the black and white areas of the checkerboard background. The relationship between this visual midpoint and the corresponding digital gray level can be used to estimate the display gamma. The simple monitor model in Eqn (1) was assumed, and thus the display gamma was estimated according to Eqn (3). As explained earlier, one would expect the theoretical midgray point to have a lightness value of $L^*=50$ which corresponds to luminance of $L=0.18$. However, pilot experiments showed that observers were picking a midpoint that was somewhat lighter. A regression of the pilot data resulted in $L=0.28$ which corresponds to $L^*=60$. One possible explanation for this bias is that a larger fraction of the text in FIG. 9 is against the black background, hence moving the lightness level for optimum legibility to a value higher than $L=0.18$. This consistent offset can be incorporated into the gamma correction derived from readability.

Example 2

Sine Width Determination

This task is shown in FIG. 10. The observer is presented with a vertical sinusoidal pattern, and adjusts the slider using a mouse or other input device until the light and dark areas appear equal in width. The slider position determines the exponent p of a power-law function that is applied to the sinusoid image. The display gamma can be estimated with the following assumptions: i) equal-width occurs when the displayed image is in $L^*$ space; ii) the relationship between $L^*$ and luminance can be approximated by a power-law function, with a power of 2.38 (this value was obtained by least squares regression between luminance and lightness data). The estimate of display gamma from Task 3 is thus given by: $\gamma=2.38/p$.

It is understood that presenting two sinusoids of identical frequency, but offset by $\pi$ (180°) in phase with respect to each other (FIG. 8) normally simplifies the width/size estimation.

Example 3

Text on Sinusoid

This task is shown in FIG. 11, and attempts to combine the ideas in Example 1 (i.e. maximizing legibility of the text against the background) and Example 2 (i.e. equalizing sine width). The slider position determines two independent functions: i) the power-law for the sinusoidal image (as in Task 3), and ii) the gray-level of the text. As the slider moves from left to right under user control by mouse or otherwise, the power-law exponent increases, and the dark portions of the sinusoid increase in width. At the same time, the text gray-level increases, thus becoming lighter.

The text string is designed so that both the odd letters and the even letters themselves form valid words. At one end of the slider, only the odd letters can be seen (i.e. the word FIN); at the other end, only the even letters can be read (i.e. the word RED). The observer is asked to adjust the slider until there is a visual balance between the odd and even letters, and the entire word FRIEND can be read. FIG. 11 shows what the observer sees for different slider settings.

Feedback from observers indicated that the legibility of the text was far more important than equalizing of the sine width. Hence the display gamma was estimated from the digital gray-level of the text using Eqn (3).

An important point is that for this task to work effectively, it is critical to properly bracket the slider range. Excessively low or high exponents in the power-law applied to the sinusoid will result in the entire word FRIEND becoming visible at one or both ends of the slider. Proper bracketing requires approximate knowledge of the display gamma. The initial gamma estimate from Task 1 can be used for this purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. For a display monitor subject to a power law equation $L=(\alpha D+\beta)^\gamma+\phi$, where: L=output luminance; D=input digital gray level; $\alpha$=gain; $\beta$=offset; $\phi$=external light flare; and $\gamma$=gamma, a method for deriving gamma based upon visual output of the display, the method comprising:
    displaying test pattern to a user on the display monitor, the test pattern comprising at least one of: a pattern of alternating light and dark regions displayed to the user at different gamma correction levels; a grayscale character string displayed to the user at different digital gray levels against a background of two known luminance levels;
    receiving input from a user as to at least one of: (i) a gamma correction level that results in the pattern of alternating light and dark regions having light and dark regions of perceived equal size as viewed on the display monitor and judged by said user; and, (ii) a luminance level for the grayscale character string that results in the user perceiving maximum readability of the grayscale character string relative to the two known background luminance levels as viewed on the display monitor and judged by said user; and,
    deriving gamma for the display monitor based upon the user input and using the derived gamma value according to said power law equation to calibrate the display monitor and thus adjust the output luminance (L) of the display monitor for given input digital gray levels (D).

2. The method as set forth in claim 1, wherein:
    the step of displaying a pattern of alternating light and dark regions the user at different gamma correction levels comprises displaying a plurality of lightness patterns simultaneously to the user;
    each lightness pattern comprises the pattern of alternating light and dark regions;
    each lightness pattern is precorrected for a presumed display monitor non-linearity gamma; and wherein
    the step of calibrating the display monitor based upon the input received from the user comprises calibrating the display monitor according to the presumed gamma associated with the lightness pattern selected by the user as having light and dark regions of perceived equal size.

3. The method as set forth in claim 2, wherein each lightness pattern is derived from an input image defined according to a sinusoidal variation in lightness.

4. The method as set forth in claim 1, wherein:
    the step of displaying a grayscale character string to the user at different digital gray levels against a background of two known luminance levels comprises displaying a readability test pattern defined by a plurality of readability patches, wherein each readability patch comprises the a gray level character string S displayed against the background of two known luminance levels, and wherein the gray level character strings of the readability patches have differing digital gray levels as compared to each other;
    the step of calibrating the display monitor based upon the input received from the user comprises calibrating the display monitor according to the digital gray level of the character string associated with the readability patch selected by the user as having maximum readability of the grayscale character string relative to the two known luminance levels of the background.

5. The method as set forth in claim 4, wherein the step of deriving gamma for the display monitor based upon the input received from the user comprises deriving gamma based upon a relationship between: (i) a predefined luminance (L) known to result in equal perceived contrast between the character string and the two known luminance levels of the background; and (ii) the gray level (D) of the character string associated with the readability patch selected by the user as having equal contrast between the character string and the two known luminance levels of the background.

6. The method as set forth in claim 5, wherein the step of deriving gamma for the display monitor based upon the input received from the user comprises deriving a value gamma ($\gamma$) for the display monitor according to $\gamma=\log(L)/\log(D)$ where D is the gray level of the character string associated with the readability patch selected by the user; L is the luminance known to result in equal perceived contrast between the character string and the two known luminance levels of the background; where D and L are each normalized to a range of 0 to 1, and where the offset and flare terms $\beta=\phi=0$, and the gain $\alpha=1$.

7. The method as set forth in claim 1, where the two known luminance levels of the background are 0 and 1.

* * * * *